Figures 1, 2:
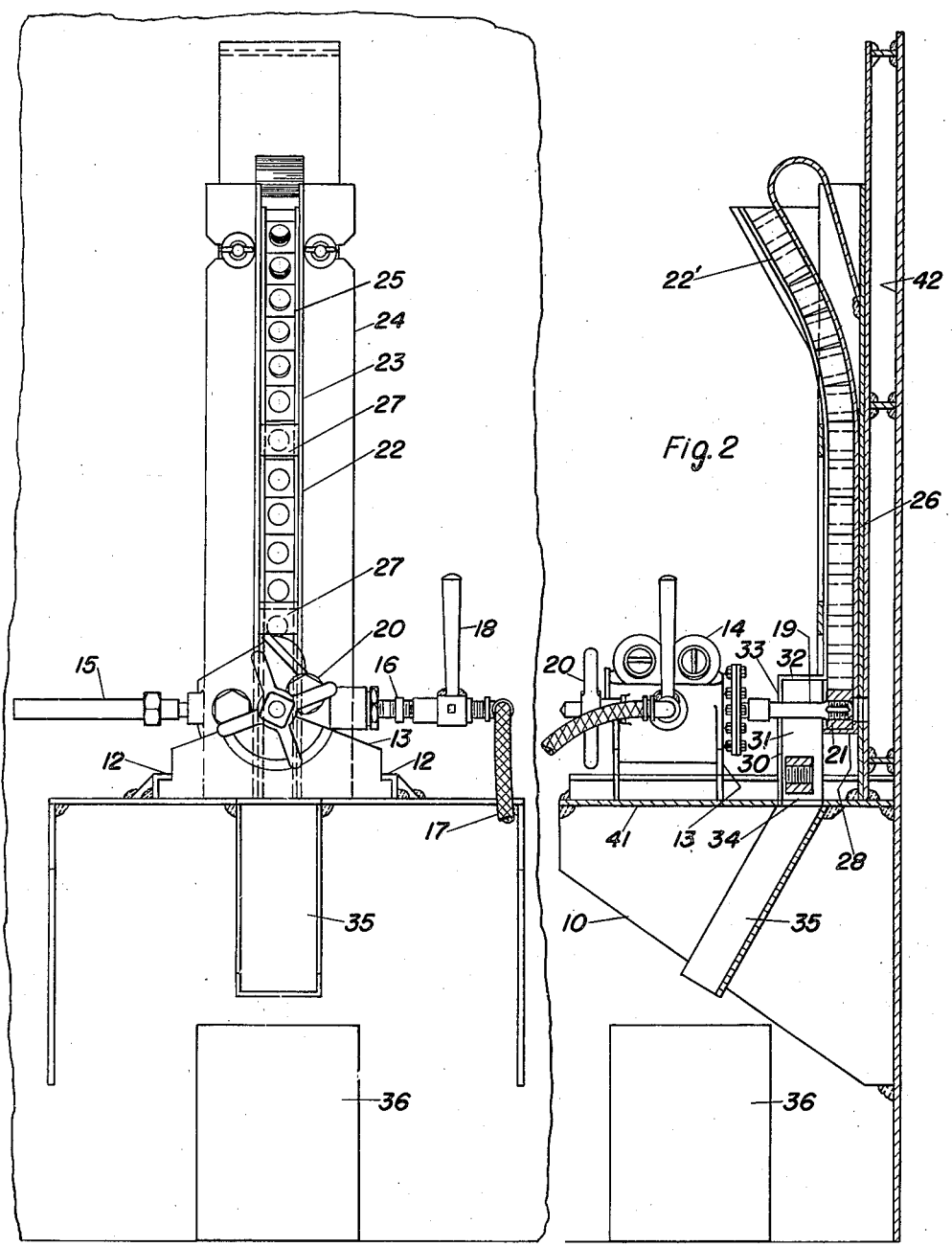

Sept. 20, 1938.  LE ROY J. KNETTLE  2,130,348
NUT THREADING DEVICE
Filed Feb. 28, 1938

INVENTOR
*LEROY J. KNETTLE*
BY
ATTORNEY

Patented Sept. 20, 1938

2,130,348

UNITED STATES PATENT OFFICE 2,130,348

NUT THREADING DEVICE

Le Roy J. Knettle, Gloucester, N. J.

Application February 28, 1938, Serial No. 192,938

1 Claim. (Cl. 10—139)

(Granted under the act of March 3, 1883, as amended April 30, 1928; 370 O. G. 757)

This invention relates to a nut threading machine, and has for an object to provide an improved device for threading nuts or for reclaiming used nuts, which will be rapid, easy and inexpensive of operation.

A further object of this invention is to provide a nut threading machine wherein a supply of nuts or nut blanks may be placed in position to feed themselves into proper cooperative relation with the threading or rethreading nut tap and which, after the thread has been properly tapped therein, the nut automatically discharges from the machine into a convenient receptacle such as a barrel or the like.

With the foregoing and other objects in view, the invention consists in the construction and arrangement of parts hereinafter described and illustrated in the drawing, in which, Fig. 1 is a front plan view of the nut threading or tapping machine of this invention, and Fig. 2 is a side plan view, partly in section.

There is shown at 10 a work bench including a table 41 and an upright 42 for supporting the device of this invention. Affixed on the table 10 is a pair of guide tracks 12, slidable within which is a carriage 13 carrying a pneumatic drilling machine 14 to which is attached a pair of handles 15 and 16. A pneumatic pressure supply hose 17 is connected to the pneumatic drilling machine 14 through the handle 16 which is provided with a pressure cut-off valve 18. A nut tap 19 whose direction of rotation may be controlled by the drill valve handle 20 is operated to thread the bottom-most nut or nut blank 21 in the nut guide 22.

This nut guide 22 consists of a pair of forwardly extending walls 23 on a plate 24, the inner sides of the walls 23 being spaced apart a distance equal to or slightly greater than the width of the nut blank 21. These walls 23 are flanged over as at 25, the depth of the walls below the flanges 25 to the back wall 26 being substantially equal in thickness to that of the nut blank 21, while a pair of bridge members 27 may connect the forward edges of walls 23 to reinforce the same. The upper end of the nut guide 22 may be extended forwardly as at 22' to be more conveniently accessible to the operator.

The lowermost nut or nut blank 21 rests upon the bottom wall or floor 28 of the nut guide 22, being held in position between the side walls 23 by the weight of the upper nut blanks resting thereon. The flanges 25 stop short of the lower wall or floor 28 by a distance substantially greater than the width of a single nut blank but somewhat less than that of two nut blanks. A chute 30 connects to the nut guide 22 between the floor 28 and the lower ends of the flanges 25 and consists of a pair of side walls 31 in the same plane as the nut guide side walls 23, the guide walls 31 being provided with top flanges 32 and vertical flanges 33 which are, in effect, a continuation of the flanges 25.

The chute 30 extends down through an aperture 34 in the table 41 to a discharging funnel 35 beneath which may be placed a barrel or other suitable container 36.

In operation, the nut blanks to be threaded or the nuts to be rethreaded are fed into the upper end of the nut guide 22 by the operator, so that the lowermost nut or nut blank 21 rests upon the nut guide floor 28. The valve handle 18 is turned to place the pneumatic drill into operation, the drill valve 20 being rotated to cause the drill to operate in a nut threading direction. The handles 15 and 16 are then grasped by the operator and the drill carriage 13 is urged forwardly within the track guide 12, causing tap 19 to drill a thread through the lowermost nut or nut blank 21, the side walls 23 preventing the nut blank from rotating. When the thread has been completed, valve 20 is actuated to reverse the direction of rotation of tap 19 and the drill carriage 13 is drawn backwardly along the track guide 12. This pulls the threaded nut 21 out from the bottom of the guide 22 and into the chute 30, where it is held against rotation by the chute side walls 31 until the tap 19 has reversed itself out of the threads in the nut, permitting the nut 21 to drop downwardly through the chute and onto a discharge funnel 35 into a suitable positioned container 36, the operation being repeated on the remaining nuts, the supply of which may be replenished from any suitable source.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

A nut threading device comprising a retractably mounted rotatable and reversible nut tap, a nut tapping machine, said nut tap being mounted on said machine, means for guiding a series of nuts or nut blanks into position before the nut tap, discharge means adjacent the bottom of the nut guiding means, said nut guiding means non-rotatably holding the lowermost nut in position before the nut tap as it is advanced and rotated and permitting said lowermost nut to progress to the nut discharge means as the nut tap is reversed and retracted, said nut discharge means non-rotatably holding the nut until the nut tap has reversed itself therefrom and then discharging it therefrom, said machine including a reversible pneumatic motor and a guideway on which said motor is advanceably and retractably mounted.

LE ROY J. KNETTLE.